United States Patent
Gupta et al.

(10) Patent No.: US 9,204,396 B2
(45) Date of Patent: Dec. 1, 2015

(54) SYSTEMS AND METHODS FOR ADAPTING A NETWORK SEARCH ALGORITHM

(71) Applicant: QUALCOMM Incorporated, San Diego, CA (US)

(72) Inventors: Sudhendra Kumar Gupta, San Diego, CA (US); Wei Qi, San Diego, CA (US); Nam Soo Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 13/763,479

(22) Filed: Feb. 8, 2013

(65) Prior Publication Data

US 2014/0226546 A1    Aug. 14, 2014

(51) Int. Cl.
| | |
|---|---|
| G08C 17/00 | (2006.01) |
| H04W 52/02 | (2009.01) |
| H04M 1/02 | (2006.01) |
| H04B 1/3883 | (2015.01) |

(52) U.S. Cl.
CPC ........ *H04W 52/0258* (2013.01); *H04M 1/0206* (2013.01); *H04B 1/3883* (2013.01)

(58) Field of Classification Search
None
See application file for complete search history.

(56) References Cited

U.S. PATENT DOCUMENTS

| | | | |
|---|---|---|---|
| 5,794,146 A | 8/1998 | Sevcik et al. | |
| 7,698,578 B2* | 4/2010 | Williams et al. | 713/300 |
| 7,907,947 B2 | 3/2011 | Ida et al. | |
| 8,155,711 B2* | 4/2012 | Deshpande et al. | 455/573 |
| 2007/0184836 A1 | 8/2007 | HC | |
| 2008/0025341 A1* | 1/2008 | Rao et al. | 370/468 |
| 2009/0022068 A1* | 1/2009 | Iyer et al. | 370/254 |
| 2009/0156271 A1 | 6/2009 | Islam et al. | |
| 2009/0215442 A1 | 8/2009 | Lindoff et al. | |
| 2009/0253469 A1* | 10/2009 | Herczog | 455/573 |
| 2009/0289601 A1 | 11/2009 | Kanade et al. | |
| 2009/0309711 A1* | 12/2009 | Adappa et al. | 340/501 |
| 2010/0311473 A1* | 12/2010 | Deshpande et al. | 455/573 |
| 2012/0075992 A1 | 3/2012 | Shahidi et al. | |
| 2012/0258715 A1 | 10/2012 | Souissi et al. | |
| 2013/0196651 A1* | 8/2013 | Ekici et al. | 455/426.1 |

OTHER PUBLICATIONS

International Search Report and Written Opinion—PCT/US2014/014686—ISAEPO—Apr. 28, 2014.

* cited by examiner

*Primary Examiner* — Bob Phunkulh
(74) *Attorney, Agent, or Firm* — Austin Rapp & Hardman

(57) ABSTRACT

An apparatus operable in a communication system is described. The apparatus includes means for obtaining a wireless communication device thermal condition input. The apparatus also includes means for adapting a network search algorithm. Adapting a network search algorithm includes adapting a network search algorithm based on the wireless communication device thermal condition input.

49 Claims, 11 Drawing Sheets

SYSTEMS AND METHODS FOR ADAPTING A NETWORK SEARCH ALGORITHM

TECHNICAL FIELD

The present disclosure relates generally to electronic systems. More specifically, the present disclosure relates to systems and methods for adapting a network search algorithm.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform functions faster, more efficiently or with higher quality are often sought after.

Some electronic devices (e.g., cellular phones, smartphones, computers, etc.) communicate with other electronic devices via a network. For example, a wireless communication device (e.g., cellular phone, smartphone, etc.) may wirelessly communicate with another wireless communication device via a wireless network. This may enable the wireless communication device to access and/or communicate voice, video, data and so on.

Wireless communication devices are often powered with batteries. Thus, increased battery life and/or power efficiency may be desirable attributes in wireless communication devices. Accordingly, power efficiency may be an issue in wireless communication device operation. As can be seen from this discussion, systems and methods for increasing the power efficiency of wireless communication devices may be beneficial.

DETAILED DESCRIPTION

Figure 1:
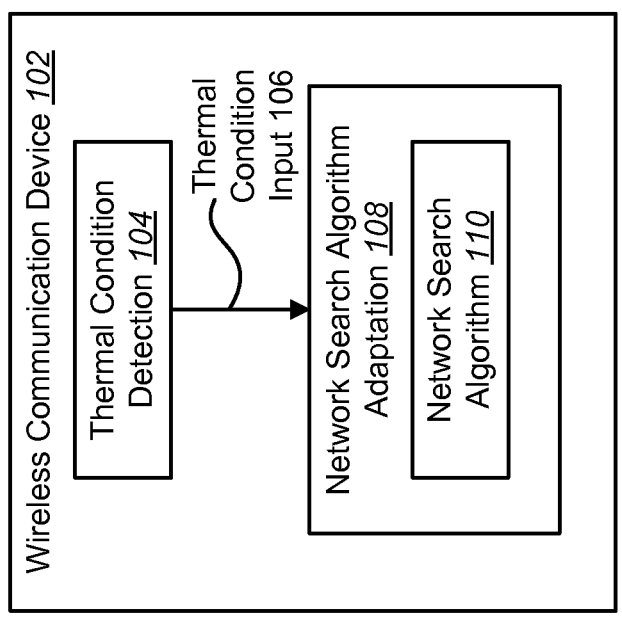
FIG. 1 is a block diagram illustrating one configuration of a wireless communication device in which systems and methods for adapting a network search algorithm may be implemented.

Some network search algorithms (e.g., out of service (OOS) network search algorithm and better system (re)selection (BSR) network search algorithm) do not take battery level, thermal conditions and other peripheral conditions (e.g., whether a wireless communication device is connected to a wireless local area network (WLAN)) into account. As a result, the battery may drain quickly and the device may overheat.

The systems and methods disclosed herein describe a wireless communication device for adapting a network search algorithm. The wireless communication device may adapt a network search algorithm (e.g., an out of service network search algorithm or a better system (re)selection network search algorithm) timeline based on one or more peripheral conditions. For example, the wireless communication device may obtain or receive a wireless communication device thermal condition input. If the wireless communication device thermal condition input reaches a certain threshold, the wireless communication device may alter the network search algorithm. For example, the wireless communication device may increase a network search sleep cycle or increase the network search timeline. Adapting the network search algorithm in this fashion may improve the battery life, increase the standby time by reducing battery drainage and make the wireless communication device safer by preventing overheating. Other examples of inputs that may be used include a battery level input and a connection status input.

The 3rd Generation Partnership Project (3GPP) is a collaboration between groups of telecommunications associations that aims to define a globally applicable 3rd generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

In the following description, for reasons of conciseness and clarity, terminology associated with the LTE standards, as promulgated under 3GPP by the International Telecommunication Union (ITU), is used. It should be noted that the systems and methods disclosed herein are also applicable to other technologies, such as technologies and the associated standards related to code division multiple access (CDMA), time division multiple access (TDMA), frequency division multiple access (FDMA), orthogonal frequency division multiple access (OFDMA) and so forth. Terminologies associated with different technologies can vary. For example, depending on the technology considered, a wireless device can sometimes be called a user equipment, a mobile station, a mobile terminal, a subscriber unit, an access terminal, etc., to name just a few. Likewise, a base station can sometimes be called an access point, a Node B, an evolved Node B and so forth. It here should be noted that different terminologies apply to different technologies when applicable.

Some communication devices (e.g., access terminals, client devices, client stations, etc.) may wirelessly communicate with other communication devices. Some communication devices (e.g., wireless communication devices) may be referred to as mobile devices, mobile stations, subscriber stations, clients, client stations, user equipment (UEs), remote stations, access terminals, mobile terminals, terminals, user terminals, subscriber units, etc. Examples of communication devices include cellular telephone base stations or nodes, access points, wireless gateways, wireless routers, laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment, remote terminal, access point, base station, Node B, evolved Node B, etc.).

It should be noted that an ordinal term (e.g., "first," "second," "third," etc.) may not by itself indicate any priority or number of elements with respect to another, but may distinguish one element from another element. Unless expressly limited by its context, each of the terms "plurality" and "set" is used herein to indicate an integer quantity that is greater than one.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed but is merely representative of the systems and methods. Features and/or elements depicted in a Figure may be combined with one or more features and/or elements depicted in one or more other Figures.

FIG. 1 is a block diagram illustrating one configuration of a wireless communication device 102 in which systems and methods for adapting a network search algorithm 110 may be implemented. The wireless communication device 102 may also be referred to as, and may include some or all of the functionality of, a terminal, an access terminal, a subscriber unit, a station, a user equipment, etc. Examples of wireless communication devices 102 may include a cellular phone, a personal digital assistant (PDA), a wireless device, a wireless modem, a handheld device, a laptop computer, a session initiation protocol phone, a wireless local loop (WLL) station, etc.

The wireless communication device 102 may include a thermal condition detection block/module 104 and/or a network search algorithm adaptation block/module 108. As used herein, the phrase "block/module" indicates that a particular component may be implemented in hardware, software or a combination of both. For example, the thermal condition detection block/module 104 may be implemented with hardware components such as circuitry and/or software components such as instructions or code, etc.

The thermal condition detection block/module 104 may detect a wireless communication device 102 thermal condition. In some implementations, the wireless communication device 102 thermal condition may indicate a temperature of the wireless communication device 102. Additionally or alternatively, the wireless communication device 102 thermal condition may indicate a temperature of one or more wireless communication device 102 components. For example, the thermal condition detection block/module 104 may detect a wireless communication device 102 processor temperature. The wireless communication device 102 thermal condition may include the temperature of other components and/or circuitry of the wireless communication device 102.

In some implementations, the thermal condition detection block/module 104 may include circuitry and/or components to detect the wireless communication device 102 thermal condition. For example, the thermal condition detection block/module 104 may include a thermal sensor that may be coupled to circuitry. In this example, the thermal sensor may detect a wireless communication device 102 thermal condition (e.g., a temperature of at least one component of the wireless communication device 102).

The thermal condition detection block/module 104 may be coupled to the network search algorithm adaptation block/module 108. In some implementations, the thermal condition detection block/module 104 may provide the network search algorithm adaptation block/module 108 with a wireless communication device 102 thermal condition input 106. The wireless communication device 102 thermal condition input 106 may indicate to the network search algorithm adaptation block/module 108 the wireless communication device 102 thermal condition. For example, the wireless communication device 102 thermal condition input 106 may be a value indicating the temperature of at least one wireless communication device 102 component.

The network search algorithm adaptation block/module 108 may include a network search algorithm 110. The network search algorithm 110 may manage a wireless communication device's 102 network search. For example, the network search algorithm 110 may direct a wireless communication device 102 to enable and/or disable a receiver to search for available network service. The network search algorithm 110 may indicate a network search timeline. For example, the network search algorithm 110 may indicate a network search duration (e.g., a time during which the wireless communication device 102 is actively searching for network service). Additionally or alternatively, the network search algorithm 110 may indicate a network search sleep cycle (e.g., a time during which the wireless communication device 102 is not actively searching for network service). While FIG. 1 depicts the network search algorithm 110 included in the network search algorithm adaptation block/module 108, in some implementations, the network search algorithm 110 may be distinct from the network search algorithm adaptation block/module 108. In these implementations, the network search algorithm adaptation block/module 108 may be coupled to and/or control the network search algorithm 110.

In some implementations, the network search algorithm 110 may instruct the wireless communication device 102 to search for network service when the wireless communication device 102 is not currently connected to a network. For example, the network search algorithm 110 may be an out of service network search algorithm 110. In other implementations, the network search algorithm 110 may instruct the wireless communication device 102 to search for network service while the wireless communication device 102 is currently connected to a network. For example, the network search algorithm 110 may be a better system selection network search algorithm 110.

The network search algorithm adaptation block/module 108 may adapt the network search algorithm 110 (e.g., the out of service network search algorithm 110 and/or the better system selection network search algorithm 110) based on the wireless communication device 102 thermal condition input 106. For example, the network search algorithm adaptation block/module 108 may adapt the network search algorithm 110 when the received wireless communication device 102 thermal condition input 106 indicates that the wireless communication device 102 temperature, or the temperature of at least one of the wireless communication device 102 components, is at least equal to a certain temperature. As will be described in detail below, the network search algorithm adaptation block/module 108 may adapt the network search algorithm 110 when the wireless communication device 102 thermal condition input 106 is at least equal to at least one thermal condition threshold.

The network search algorithm adaptation block/module 108 may adapt the network search timeline. In some implementations, the network search algorithm adaptation block/module 108 may adapt one or more characteristics of the network search timeline. For example, the network search algorithm adaptation block/module 108 may increase a network search sleep cycle (e.g., a time during which the wireless communication device 102 is not actively searching for network service). In some implementations, the network search sleep cycle may be a period of time between active network searches. Additionally or alternatively, the network search algorithm adaptation block/module 108 may reduce a network search duration (e.g., a time during which the wireless communication device 102 is actively searching for network service).

The wireless communication device 102 may include one or more receivers and/or antennas (not illustrated in FIG. 1). In some implementations, the network search algorithm adaptation block/module 108 may control the one or more receivers and/or antennas. For example, if the wireless communication device 102 thermal condition input 106 indicates that the wireless communication device 102 has a high temperature, the network search algorithm adaptation block/module 108 may control the one or more receivers and/or antennas in accordance with an increased network search sleep cycle and/or reduced search time. For instance, the one or more receivers and/or antennas may be activated less frequently and/or may be activated for shorter periods for network searches.

Figure 2:
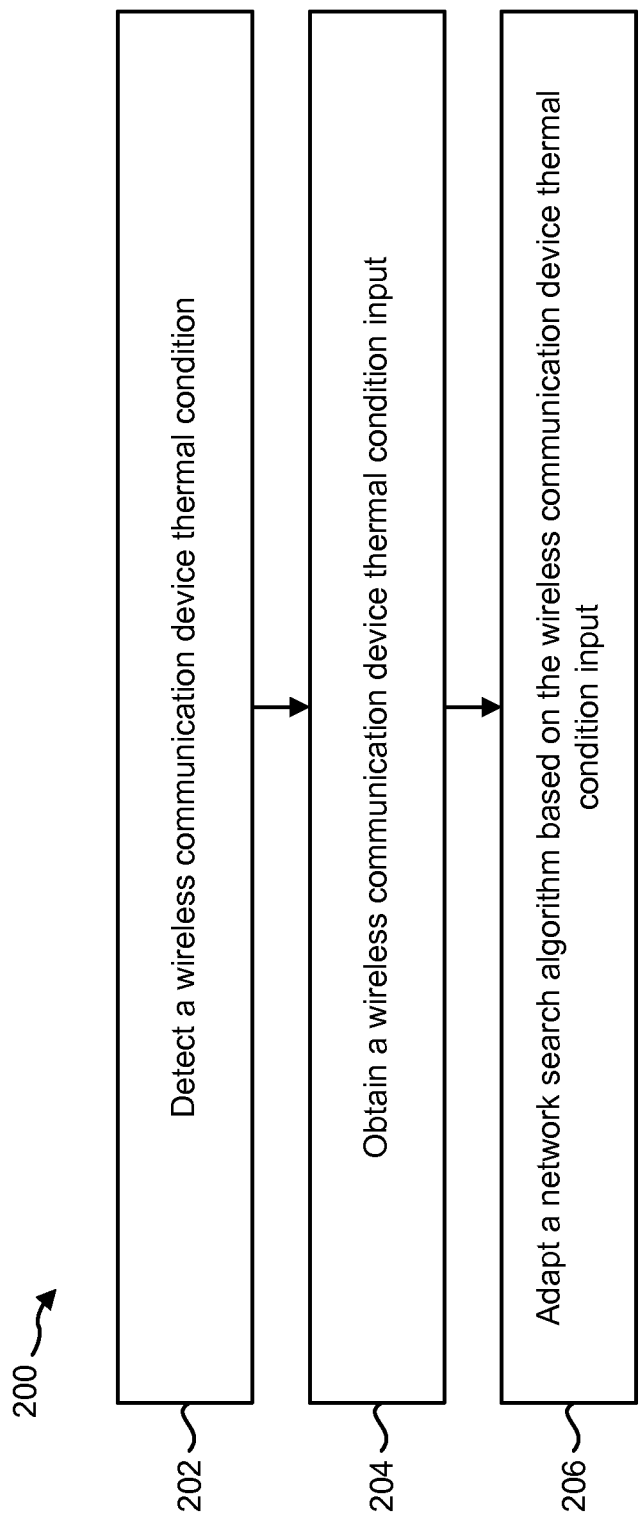
FIG. 2 is a flow diagram illustrating one configuration of a method for adapting a network search algorithm.

FIG. 2 is a flow diagram illustrating one configuration of a method 200 for adapting a network search algorithm 110. In some implementations, the method 200 may be performed by the wireless communication device 102. The wireless communication device 102 may detect 202 a wireless communication device 102 thermal condition. For example, the thermal condition detection block/module 104 of the wireless communication device 102 may detect 202 a wireless communication device 102 thermal condition. As explained above, a wireless communication device 102 thermal condition may include a temperature of at least one wireless communication device 102 component (e.g., a wireless communication device 102 processor) and/or the temperature of the wireless communication device 102. The wireless communication device 102 may be coupled to circuitry that detects 202 the wireless communication device 102 thermal condition. For example, the wireless communication device 102 may be coupled to, or include, a thermal sensor and/or additional circuitry that detects the temperature of at least one component of the wireless communication device 102.

The wireless communication device 102 may obtain 204 a wireless communication device 102 thermal condition input 106. For example, the wireless communication device 102 may obtain 204 the wireless communication device 102 thermal condition input 106 from the thermal condition detection block/module 104. In some implementations, the network search algorithm adaptation block/module 108 may receive the wireless communication device 102 thermal condition input 106 from the thermal condition detection block/module 104. As described above, in some implementations, the wireless communication device 102 thermal condition input 106 may indicate the wireless communication device 102 thermal condition (e.g., a value indicating the temperature of the wireless communication device 102).

The wireless communication device 102 may adapt 206 a network search algorithm 110 (e.g., an out of service network search algorithm 110 and/or a better system selection network search algorithm 110) based on the wireless communication device 102 thermal condition input 106. The wireless communication device 102 may adapt the timeline of a network search. For example, the wireless communication device 102 may increase the network search sleep cycle if the wireless communication device 102 thermal condition input 106 indicates that the wireless communication device 102 temperature is above a certain value. Examples of elements in a network search that may be adapted include, but are not limited to, a network search sleep cycle and a network search duration.

Figure 3:
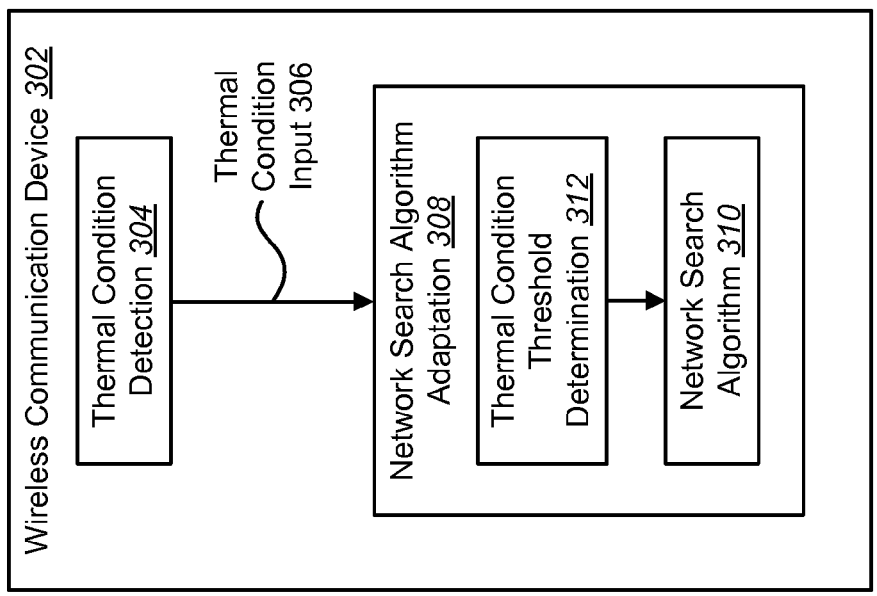
FIG. 3 is a block diagram illustrating a more specific configuration of a wireless communication device in which systems and methods for adapting a network search algorithm may be implemented.

FIG. 3 is a block diagram illustrating a more specific configuration of a wireless communication device 302 in which systems and methods for adapting a network search algorithm 310 may be implemented. The wireless communication device 302 may be an example of the wireless communication device 102 described in connection with FIG. 1. The wireless communication device 302 may include a thermal condition detection block/module 304 and a network search algorithm adaptation block/module 308 that may be examples of corresponding elements described in connection with FIG. 1. As described above, the thermal condition detection block/module 304 may provide a wireless communication device 302 thermal condition input 306 that may be an example to the wireless communication device 102 thermal condition input 106 described in connection with FIG. 1.

In some configurations, the network search algorithm adaptation block/module 308 may include a thermal condition threshold determination block/module 312. The thermal condition threshold determination block/module 312 may determine whether the wireless communication device 302 thermal condition input 306 is at least equal to a first thermal condition threshold. For example, the thermal condition threshold determination block/module 312 may determine whether the wireless communication device 302 temperature (or the temperature of at least one wireless communication device 302 component) is above a threshold value. While FIG. 3 depicts the thermal condition threshold determination block/module 312 included in the network search algorithm adaptation block/module 308, in some implementations, the thermal condition threshold determination block/module 312 may be distinct from the network search algorithm adaptation block/module 308. In these implementations, the network search algorithm adaptation block/module 308 may be coupled to the thermal condition threshold determination block/module 312.

In some implementations, if the thermal condition threshold determination block/module 312 determines that the wireless communication device 302 thermal condition input 306 is at least equal to a first thermal condition threshold, the wireless communication device 302, (e.g., the network search algorithm adaptation block/module 308), may adapt a network search algorithm 310 that may be an example of the network search algorithm 110 described in connection with FIG. 1. In some implementations, the network search algorithm 310 may be adapted as described earlier (e.g., increase the network search sleep cycle and/or reduce the network search duration).

Figure 4:
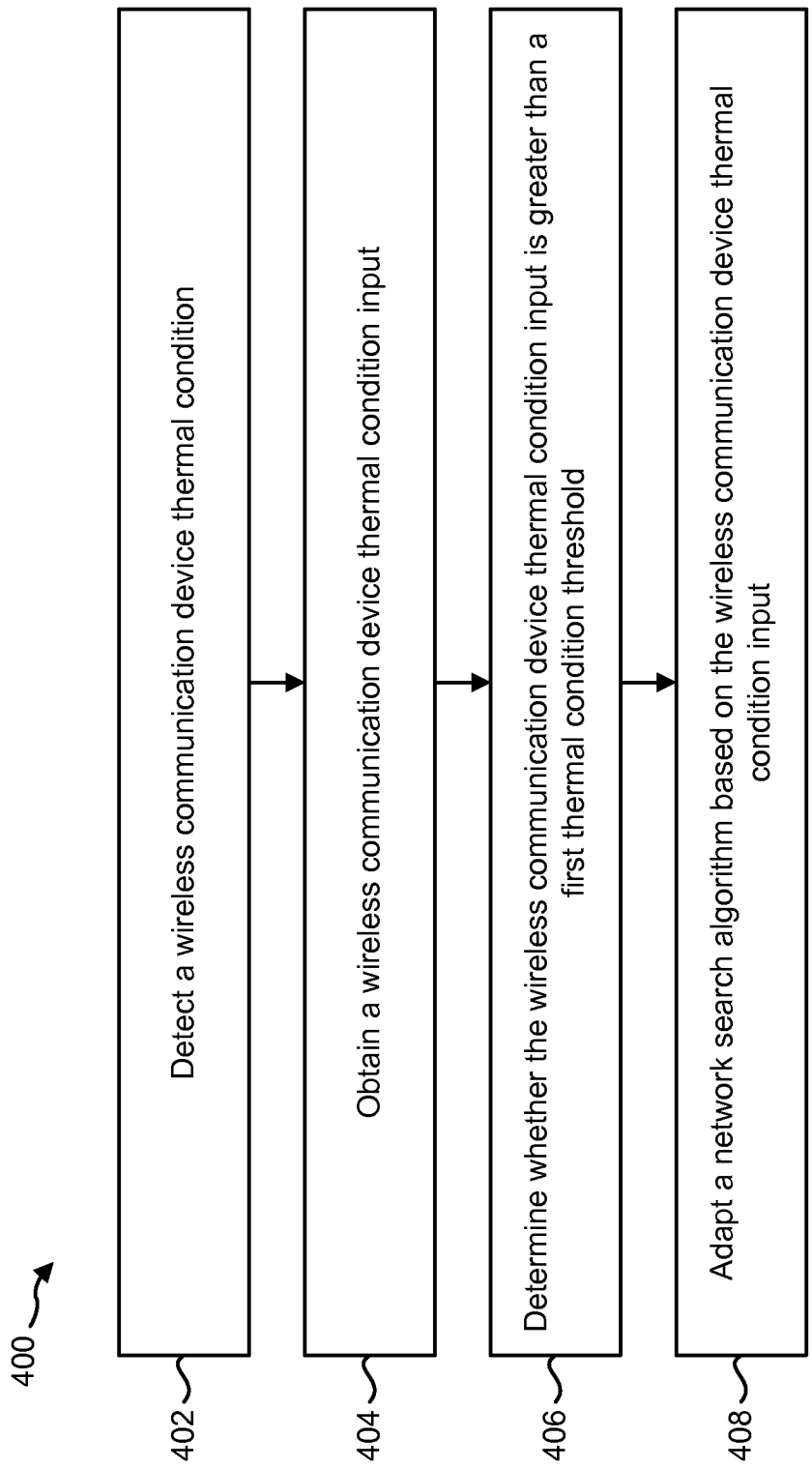
FIG. 4 is a flow diagram illustrating a more specific configuration of a method for adapting a network search algorithm.

FIG. 4 is a flow diagram illustrating a more specific configuration of a method 400 for adapting a network search algorithm 310. The method 400 may be performed by the wireless communication device 302. The wireless communication device 302 may detect 402 a wireless communication device 302 thermal condition. In some implementations, this may be done as described in connection with FIG. 2.

The wireless communication device 302 may obtain 404 a wireless communication device 302 thermal condition input 306. In some implementations, this may be done as described in connection with FIG. 2.

The wireless communication device 302 may determine 406 whether the wireless communication device 302 thermal condition input 306 is at least equal to a first thermal condition threshold. In some implementations, the wireless communication device 302 may determine whether the temperature of the wireless communication device 302 is at least equal to a threshold temperature. For example, if the threshold temperature is approximately 95 degrees Fahrenheit, the wireless communication device 302 may determine whether the wireless communication device 302 temperature is at least equal to 95 degrees Fahrenheit. Additionally or alternatively, the wireless communication device 302 may determine whether the temperature of at least one of the wireless communication device 302 components (e.g., a wireless communication device 302 processor) is at least equal to a temperature threshold.

The wireless communication device 302 may adapt 408 a network search algorithm 310 based on the wireless communication device 302 thermal condition input 306. In some implementations, this may be done as described in connection with FIG. 2. For example, if the wireless communication device 302 determines 406 that the wireless communication device 302 thermal condition input 306 is at least equal to the first thermal condition threshold, then the wireless communication device 302 may adapt 408 the network search algorithm 310. In other words, the wireless communication device 302 may adapt 408 the network search algorithm 310 when the wireless communication device 302 thermal condition input 306 is at least equal to the first threshold.

Figure 5:
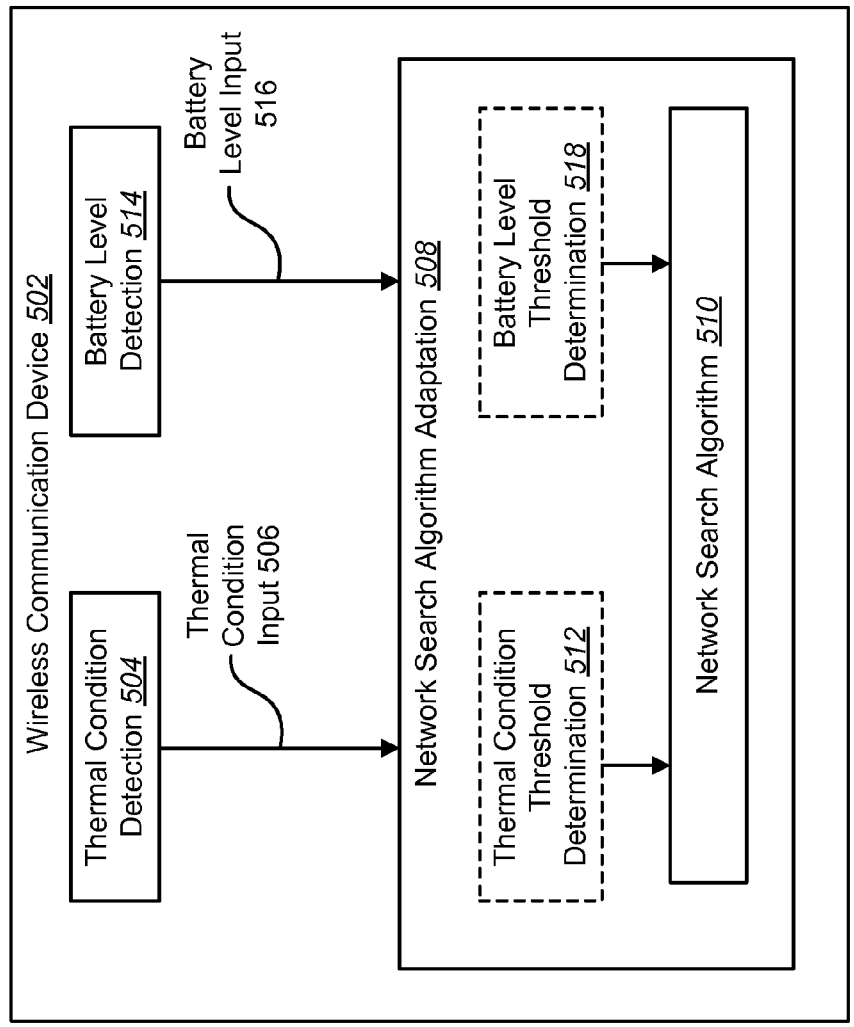
FIG. 5 is a block diagram illustrating another configuration of a wireless communication device in which systems and methods for adapting a network search algorithm may be implemented.

FIG. 5 is a block diagram illustrating another configuration of a wireless communication device 502 in which systems and methods for adapting a network search algorithm 510 may be implemented. The wireless communication device 502 may be an example of the wireless communication device 102 described in connection with FIG. 1. The wireless communication device 502 may include a thermal condition detection block/module 504 and/or a network search algorithm adaptation block/module 508 that may be examples of corresponding elements described in connection with FIG. 1. The thermal condition detection block/module 504 may provide a thermal condition input 506, that may be an example of the thermal condition input 106 described in connection with FIG. 1, to the network search algorithm adaptation block/module 508. The network search algorithm adaptation block/module 508 may include a network search algorithm 510 that may be an example of the network search algorithm 110 described in connection with FIG. 1. Optionally, the network search algorithm adaptation block/module 508 may include a thermal condition threshold determination block/module 512 that may be an example of the thermal condition threshold determination block/module 312 described in connection with FIG. 3.

In some implementations, the wireless communication device 502 may include a battery level detection block/module 514. The battery level detection block/module 514 may detect a wireless communication device 502 battery level. In other words, the battery level detection block/module 514 may indicate how much battery power is available. In some configurations, the battery level detection block/module 514 may represent battery level as a percentage of the total battery power capacity. For example, the battery level detection block/module 514 may indicate that 55% of the total battery power capacity remains. Additionally or alternatively, the battery level detection block/module 514 may represent the amount of battery power available as a length of time that the battery may continue to supply power. For example, the battery level detection block/module 514 may indicate that a battery may supply power for two hours. In some implementations, the battery level detection block/module 514 may include circuitry and/or components to detect the wireless communication device 502 battery level.

The battery level detection block/module 514 may be coupled to the network search algorithm adaptation block/module 508. In some implementations, the battery level detection block/module 514 may provide the network search algorithm adaptation block/module 508 with a wireless communication device 502 battery level input 516. The wireless communication device 502 battery level input 516 may indicate to the network search algorithm adaptation block/module 508 the wireless communication device 502 battery level. For example, the wireless communication device 502 battery level input 516 may be a value indicating the level of battery power remaining in the wireless communication device 502.

Optionally, the network search algorithm adaptation block/module 508 may include a battery level threshold determination block/module 518. The battery level threshold determination block/module 518 may determine whether the wireless communication device 502 battery level input 516 is less than a battery level threshold value. For example, the battery level threshold determination block/module 518 may determine whether the percentage of total battery capacity available for a wireless communication device 502 is below a threshold value. While FIG. 5 depicts the battery level threshold determination block/module 518 included in the network search algorithm adaptation block/module 508, in some implementations, the battery level threshold determination block/module 518 may be distinct from the network search algorithm adaptation block/module 508. In these implementations, the network search algorithm adaptation block/module 508 may be coupled to the battery level threshold determination block/module 518.

In some implementations, the wireless communication device 502 may adapt the network search algorithm 510 based, at least in part, on the wireless communication device 502 battery level input 516. For example, the wireless communication device 502 may adapt a network search algorithm 510 (e.g., reducing network search duration and increase network search sleep cycle) when the wireless communication device 502 battery level input 516 is less than a battery level threshold. As will be described in detail below, the wireless communication device 502 may adapt the network search algorithm 510 based on the thermal condition input 506 and the battery level input 516.

Figure 6:
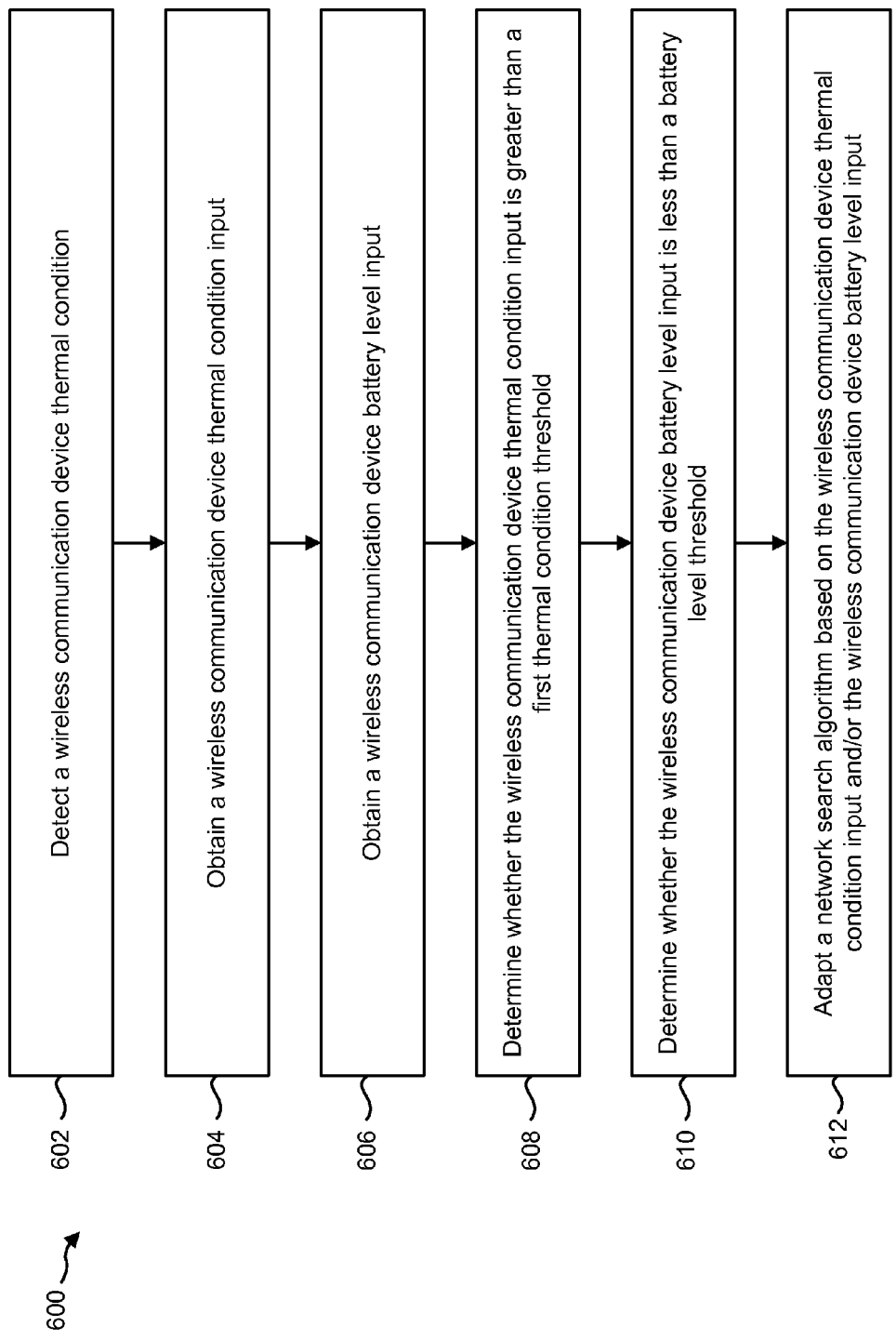
FIG. 6 is a flow diagram illustrating another configuration of a method for adapting a network search algorithm.

FIG. 6 is a flow diagram illustrating another configuration of a method 600 for adapting a network search algorithm 510. The method 600 may be performed by the wireless communication device 502. The wireless communication device 502 may detect 602 a wireless communication device 502 thermal condition. In some implementations, this may be done as described in connection with FIG. 2.

The wireless communication device 502 may obtain 604 a wireless communication device 502 thermal condition input 506. In some implementations, this may be done as described in FIG. 2.

The wireless communication device 502 may obtain 606 a wireless communication device 502 battery level input 516. For example, the wireless communication device 502 may obtain 606 the wireless communication device 502 battery level input 516 from the battery level detection block/module 514. In some implementations, the network search algorithm adaptation block/module 508 may receive the wireless communication device 502 battery level input 516 from the battery level detection block/module 514. As described above, in some implementations, the wireless communication device 502 battery level input 516 may indicate the wireless communication device 502 battery level. For example, the wireless communication device 502 battery level input 516 may indicate that 55% of the total wireless communication device 502 battery power capacity remains. Additionally or alternatively, the battery level input 516 may indicate that a wireless communication device 502 battery may supply power for two hours.

The wireless communication device 502 may determine 608 whether the wireless communication device 502 thermal condition input 506 is at least equal to a first thermal condition threshold. In some implementations, this may be done as described in connection with FIG. 4.

The wireless communication device 502 may determine 610 whether the wireless communication device 502 battery level input 516 is less than a battery level threshold. For example, if the threshold battery level is approximately 55% of total battery capacity available, the wireless communication device 502 may determine whether the wireless communication device 502 battery level input 516 indicates the wireless communication device 502 battery level is less than approximately 55% of the total wireless communication device 502 battery capacity. Additionally or alternatively, if the threshold battery level is approximately two hours of battery power available, the wireless communication device 502 may determine whether the wireless communication device 502 battery level input 516 indicates the wireless communication device 502 battery level is less than two hours of battery power available.

The wireless communication device 502 may adapt 612 a network search algorithm 510 based on the wireless communication device 502 thermal condition input 506 and/or the wireless communication device 502 battery level input 516. In some implementations, the wireless communication device 502 may adapt 612 a network search algorithm 510 based on one of the wireless communication device 502 thermal condition input 506 or the wireless communication device 502 battery level input 516. For example, the wireless communication device 502 may adapt 612 the network search algorithm 510 based on the wireless communication device 502 thermal condition input 506. In some implementations, this may be done as described in connection with FIG. 4.

The wireless communication device 502 may adapt 612 the network search algorithm 510 based on the wireless communication device 502 battery level input 516. For example, if the wireless communication device 502 determines 610 that the wireless communication device 502 battery level input 516 is less than the battery level threshold, then the wireless communication device 502 may adapt 612 the network search algorithm 510. In other words, the wireless communication device 502 may adapt 612 the network search algorithm 510 when the wireless communication device 502 battery level input 516 is less than the battery level threshold.

The wireless communication device 502 may adapt 612 the network search algorithm 510 based on both the wireless communication device 502 thermal condition input 506 and the wireless communication device 502 battery level input 516. For example, the wireless communication device 502 may adapt 612 the network search algorithm 510 when the wireless communication device 502 thermal condition input 506 is at least equal to the first thermal condition threshold and when the wireless communication device 502 battery level input 516 is less than the battery level threshold.

In some implementations, the wireless communication device 502 may adapt 612 the network search algorithm 510 based on the number of inputs (e.g., the wireless communication device 502 thermal condition input 506 and the wireless communication device 502 battery level input 516) that are greater/less than their respective thresholds. For example, the wireless communication device 502 may alter the network search algorithm 510 in a first configuration (e.g., reduce the network search duration and/or increase the network search sleep cycle) when the wireless communication device 502 thermal condition input 506 is at least equal to the first thermal condition threshold and when the wireless communication device 502 battery level input 516 is less than the battery level threshold. By comparison, the wireless communication device 502 may adapt 612 the network search algorithm 510 in a second configuration when the wireless communication device 502 thermal condition input 506 is at least equal to the first thermal condition threshold and when the wireless communication device 502 battery level input 516 is not less than the battery level threshold. In this implementation, the second configuration may differ from the first configuration. For example, the second configuration may differ from the first configuration in the value of the reduction of the network search duration and/or the value of the increase in the network search sleep cycle.

In some implementations, the wireless communication device 502 may adapt 612 the network search algorithm 510 based on the type of input (e.g., the wireless communication device 502 thermal condition input 506 and the wireless communication device 502 battery level input 516) that is greater/less than their respective thresholds. For example, the wireless communication device 502 may alter the network search algorithm 510 in a first configuration (e.g., reduce the network search duration and/or increase the network search sleep cycle) when the wireless communication device 502 thermal condition input 506 is at least equal to the first thermal condition. By comparison, the wireless communication device 502 may adapt 612 the network search algorithm 510 in a second configuration when the wireless communication device 502 battery level input 516 is less than the battery level threshold. As described above, the second configuration may differ from the first configuration.

Figure 7:
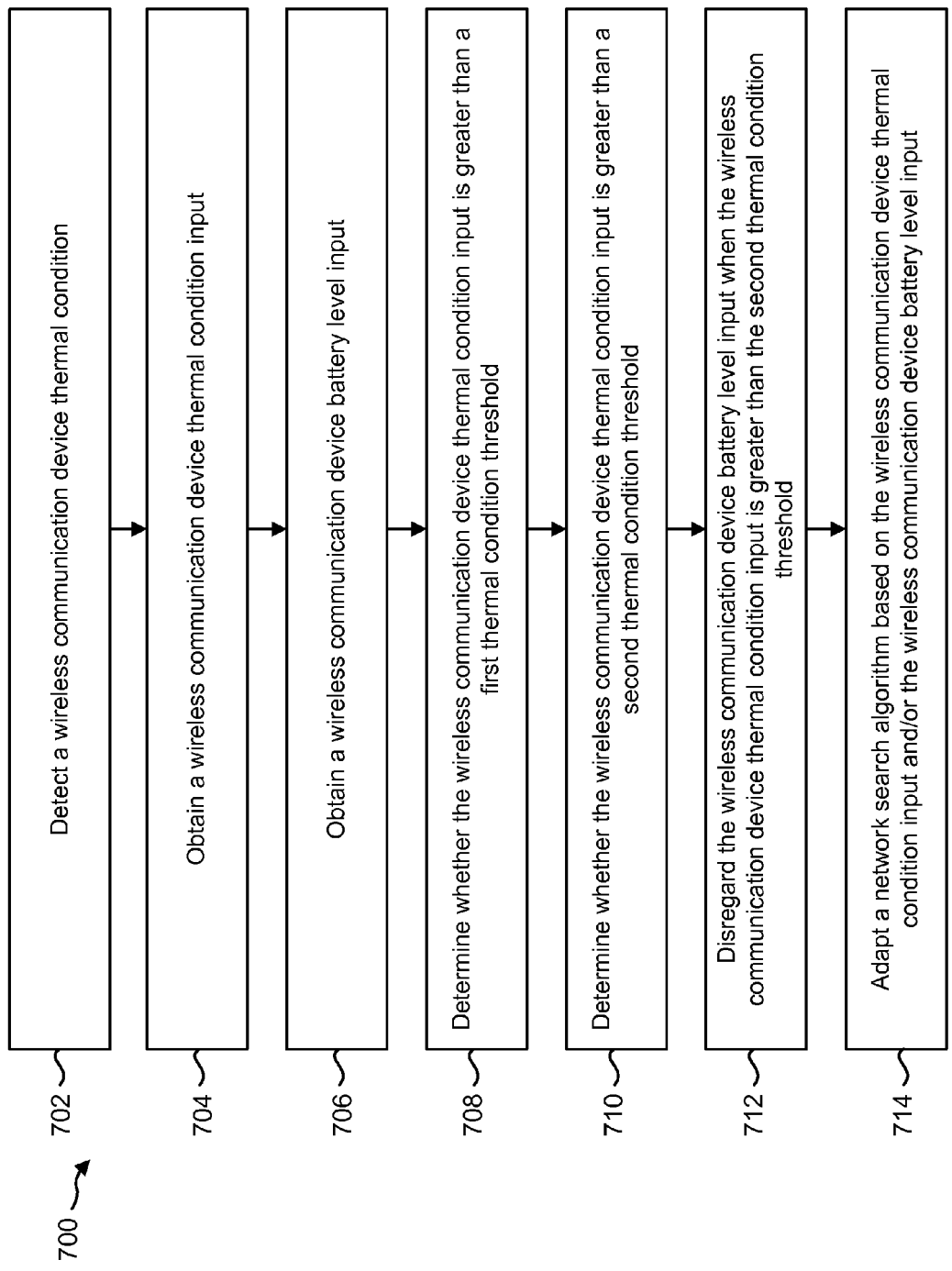
FIG. 7 is a flow diagram illustrating another configuration of a method for adapting a network search algorithm.

FIG. 7 is a flow diagram illustrating another configuration of a method 700 for adapting a network search algorithm 510. The method 700 may be performed by the wireless communication device 502. The wireless communication device 502 may detect 702 a wireless communication device 502 thermal condition. In some implementations, this may be done as described in connection with FIG. 2.

The wireless communication device 502 may obtain 704 a wireless communication device 502 thermal condition input 506. In some implementations, this may be done as described in connection with FIG. 2.

The wireless communication device 502 may obtain 706 a wireless communication device 502 battery level input 516. In some implementations, this may be done as described in connection with FIG. 6.

In some implementations, the wireless communication device 502 may determine 708 whether the wireless communication device 502 thermal condition input 506 is at least equal to a first thermal condition threshold. This may be done as described in connection with FIG. 4.

The wireless communication device 502 may determine 710 whether the wireless communication device 502 thermal condition input 506 is at least equal to a second thermal condition threshold. In some implementations, the thermal condition threshold determination block/module 512 may determine whether the wireless communication device 502 temperature (or the temperature of a wireless communication device 502 component) is above a second thermal condition threshold value. For example, if the second thermal condition threshold temperature value is approximately 115 degrees Fahrenheit, the wireless communication device 502 may determine 710 whether the wireless communication device 502 temperature is at least equal to 115 degrees Fahrenheit. Additionally or alternatively, the wireless communication device 502 may determine whether the temperature of at least one of the wireless communication device 502 components (e.g., a wireless communication device 502 processor) is at least equal to the second temperature threshold value.

In some implementations, the second thermal condition threshold may be at least equal to the first thermal condition threshold. For example, the second thermal condition threshold may include a temperature (e.g., 115 degrees Fahrenheit) that is at least equal to the first thermal condition threshold temperature (e.g., 95 degrees Fahrenheit).

According to some configurations, the wireless communication device 502 may disregard 712 the wireless communication device 502 battery level input 516 when the wireless communication device 502 thermal condition input 506 is at least equal to the second thermal condition threshold. As described above, in some implementations, the wireless communication device 502 may adapt the network search algorithm 510 based on the wireless communication device 502 thermal condition input 506 and the wireless communication device 502 battery level input 516. In these implementations, when the wireless communication device 502 determines 710 that the wireless communication device 502 thermal condition input 506 is at least equal to the second thermal condition threshold (e.g., 115 degrees Fahrenheit), the wireless communication device 502 may disregard 712 the wireless communication device 502 battery level input 516.

The wireless communication device 502 may adapt 714 the network search algorithm 510 based on the wireless communication device 502 thermal condition input 506 and/or the wireless communication device 502 battery level input 516. In some cases (where the thermal condition input 506 is at least equal to the first threshold and less than the second threshold, for example), this may be done as described in connection with FIG. 6. In other cases, the wireless communication device 502 may adapt 714 the network search algorithm 510 when the wireless communication device 502 thermal condition input 506 is at least equal to the second thermal condition threshold. For example, the wireless communication device 502 may adapt 714 the network search algorithm 510 based on the wireless communication device 502 thermal condition input 506. More specifically, the wireless communication device may adapt 714 the network search algorithm 510 based on the wireless communication device 502 thermal condition input 506 when the wireless communication device 502 has disregarded 712 the wireless communication device 502 battery level input 516.

Figure 8:
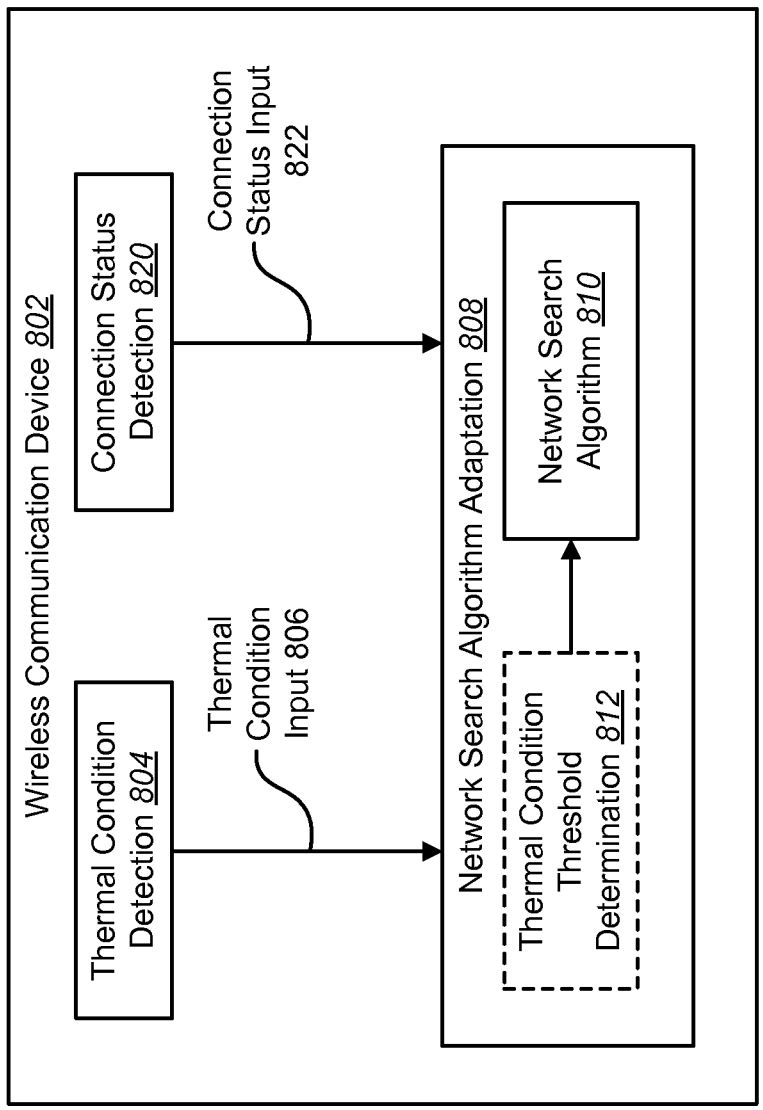
FIG. 8 is a block diagram illustrating another configuration of a wireless communication device in which systems and methods for adapting a network search algorithm may be implemented.

FIG. 8 is a block diagram illustrating another configuration of a wireless communication device 802 in which systems and methods for adapting a network search algorithm 810 may be implemented. The wireless communication device 802 may be an example of the wireless communication device 102 described in connection with FIG. 1. The wireless communication device 802 may include a thermal condition detection block/module 804 and a network search algorithm adaptation block/module 808 that may be examples of corresponding elements described in connection with FIG. 1. The thermal condition detection block/module 804 may provide a thermal condition input 806, that may be an example of the thermal condition input 106 described in connection with FIG. 1, to the network search algorithm adaptation block/module 808. The network search algorithm adaptation block/module 808 may include a network search algorithm 810 that may be an example of the network search algorithm 110 described in connection with FIG. 1. Optionally, the network search algorithm adaptation block/module 808 may include a thermal condition threshold determination block/module 812 that may be an example of the thermal condition threshold determination block/module 312 described in connection with FIG. 3.

In some implementations, the wireless communication device 802 may include a connection status detection block/module 820. The connection status detection block/module 820 may detect whether a wireless communication device 802 is connected to a network. For example, the connection status detection block/module 820 may detect whether the wireless communication device 802 is connected to a WLAN. In some implementations, the connection status detection block/module 820 may include circuitry and/or components to detect the wireless communication device 802 connection status.

The connection status detection block/module 820 may be coupled to the network search algorithm adaptation block/module 808. In some implementations, the connection status detection block/module 820 may provide the network search algorithm adaptation block/module 808 with a wireless communication device 802 connection status input 822. The wireless communication device 802 connection status input 822 may indicate to the network search algorithm adaptation block/module 808 the wireless communication device 802 connection status. As will be described below, in some implementations, the network search algorithm adaptation block/module 808 may adapt the network search algorithm 810 based on the wireless communication device 802 connection status input 822.

Figure 9:
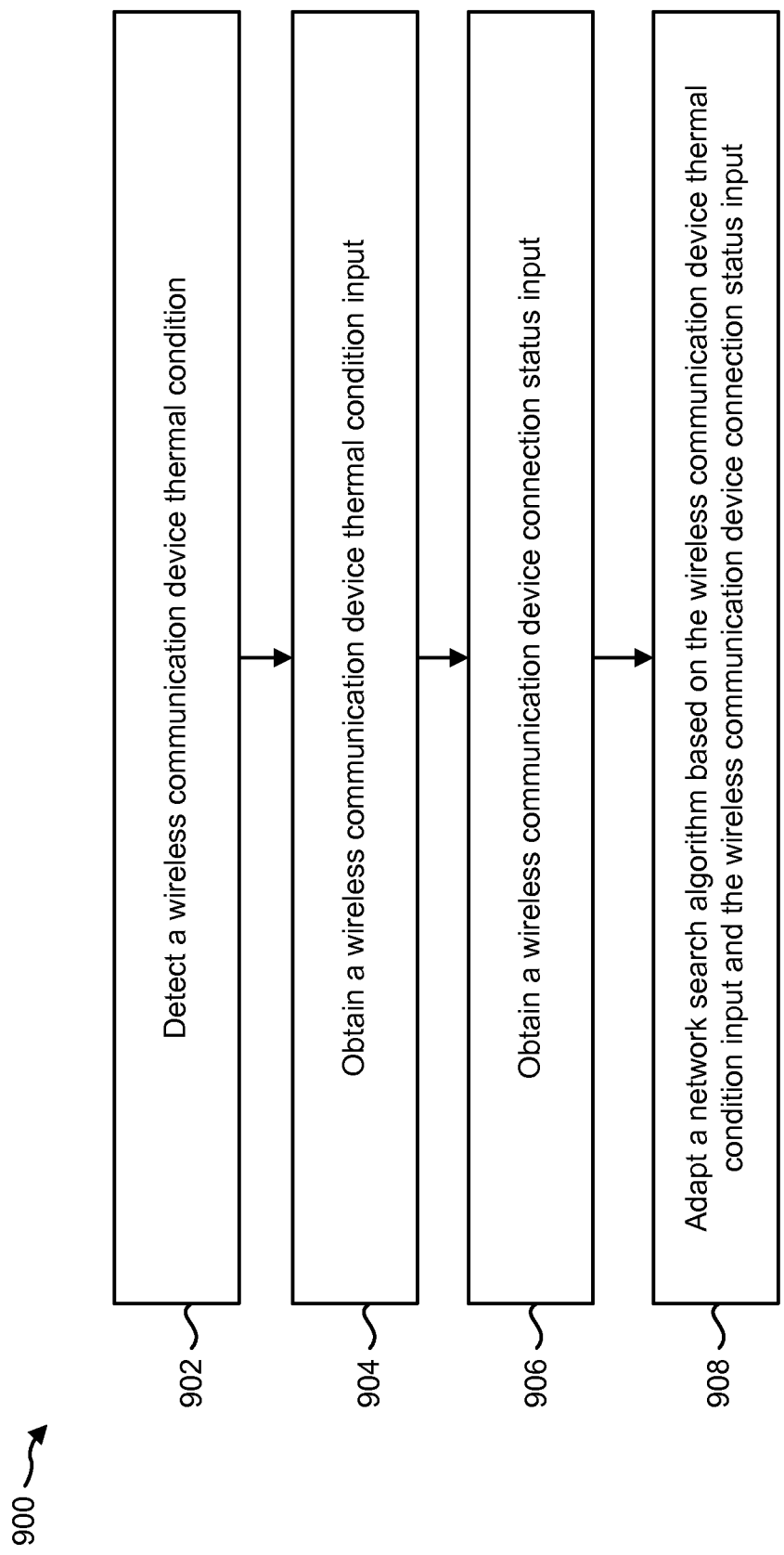
FIG. 9 is a flow diagram illustrating another configuration of a method for adapting a network search algorithm.

FIG. 9 is a flow diagram illustrating another configuration of a method 900 for adapting a network search algorithm 810. The method 900 may be performed by the wireless communication device 802. The wireless communication device 802 may detect 902 a wireless communication device 802 thermal condition. In some implementations, this may be done as described in connection with FIG. 1.

The wireless communication device 802 may obtain 904 a wireless communication device 802 thermal condition input 806. In some implementations, this may be done as described in connection with FIG. 1.

The wireless communication device 802 may obtain 906 a wireless communication device 802 connection status input 822. For example, the wireless communication device 802 may obtain 906 the wireless communication device 802 connection status input 822 from the connection status detection block/module 820. In some implementations, the network search algorithm adaptation block/module 808 may receive the wireless communication device 802 connection status input 822 from the connection status detection block/module 820. As described above, in some implementations, the wireless communication device 802 connection status input 822 may indicate the wireless communication device 802 connection status (e.g., whether the wireless communication device 802 is connected to a WLAN). In this example, the wireless communication device 802 may provide the wireless communication device 802 connection status input 822 to the network search algorithm adaptation block/module 808.

The wireless communication device 802 may adapt 908 a network search algorithm 810 based on the wireless communication device 802 thermal condition input 806 and the wireless communication device 802 connection status input 822. In some implementations, the wireless communication device 802 may adapt 908 a network search algorithm 810 based on one of the wireless communication device 802 thermal condition input 806 or the wireless communication device 802 connection status input 822. For example, the wireless communication device 802 may adapt 908 the network search algorithm 810 based on the wireless communication device 802 thermal condition input 806. In some implementations, this may be done as described in connection with FIG. 4.

The wireless communication device 802 may adapt 908 the network search algorithm 810 based on the wireless communication device 802 connection status input 822. For example, if the wireless communication device 802 determines that the wireless communication device 802 is connected to a network, then the wireless communication device 802 may adapt 908 the network search algorithm 810. In other words, the wireless communication device 802 may adapt 908 the network search algorithm 810 when the wireless communication device 802 is connected to a network.

The wireless communication device 802 may adapt 908 the network search algorithm 810 based on both the wireless communication device 802 thermal condition input 806 and the wireless communication device 802 connection status input 822. In some implementations, the wireless communication device 802 may adapt 908 the network search algorithm 810 when the wireless communication device 802 thermal condition input 806 is at least equal to the first thermal condition threshold and when the wireless communication device 802 is connected to a network. For example, if the wireless communication device 802 detects that the wireless communication device 802 thermal condition input 806 is at least equal to a first thermal condition threshold and that the wireless communication device 802 is connected (e.g., the wireless communication device 802 connection status input 822 indicates the wireless communication device 802 is connected to a WLAN), then the network search algorithm adaptation block/module 808 may increase the network search sleep cycle and/or reduce the network search duration. In some implementations, if the wireless communication device 1002 has searched for a particular network in a previous search cycle, adapting 908 a network search algorithm 810 may include avoiding searching for that particular network in a subsequent cycle.

Figure 10:
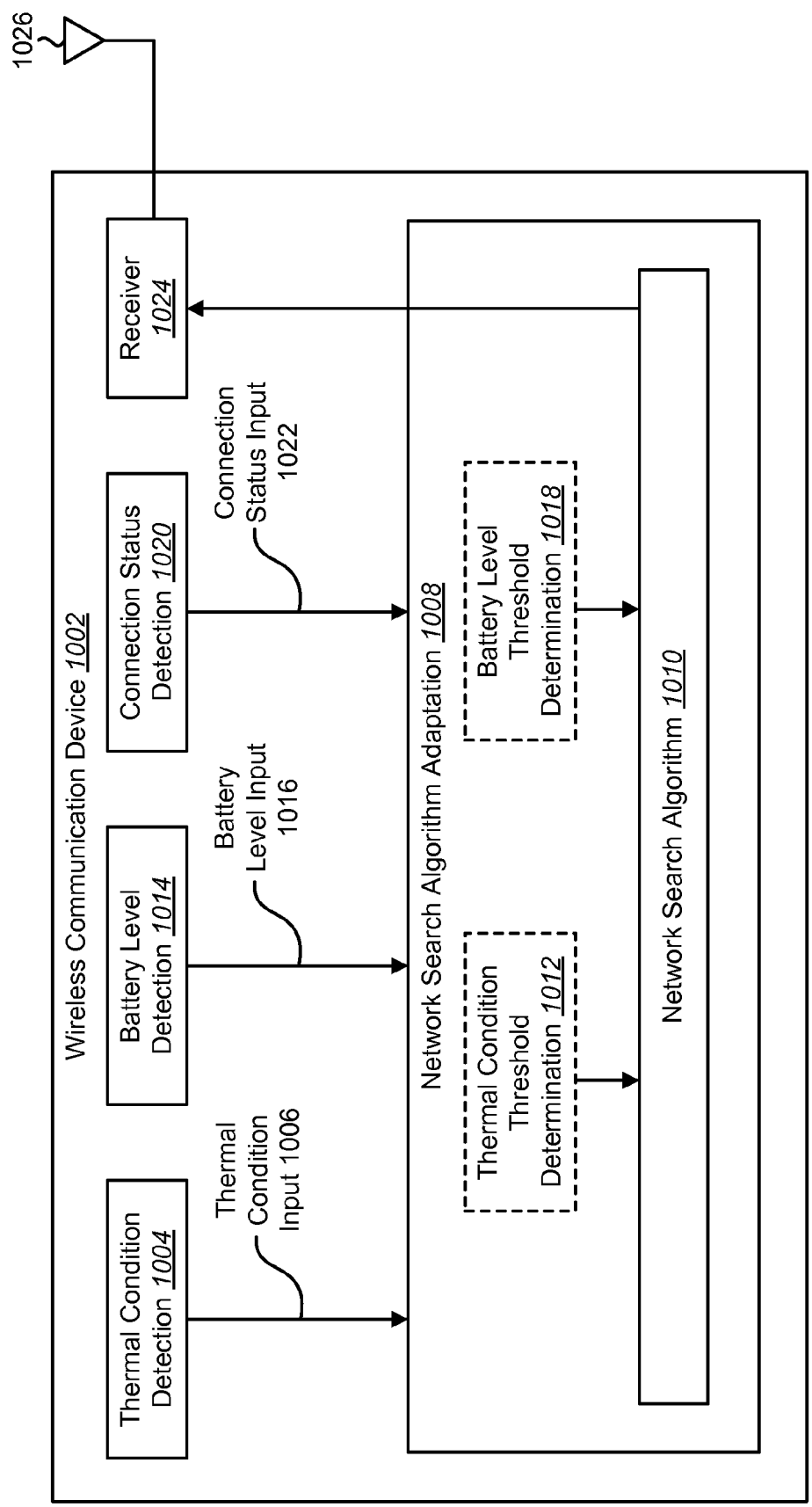
FIG. 10 is a block diagram illustrating another configuration of a wireless communication device in which systems and methods for adapting a network search algorithm may be implemented.

FIG. 10 is a block diagram illustrating another configuration of a wireless communication device 1002 in which systems and methods for adapting a network search algorithm 1010 may be implemented. The wireless communication device 1002 may be an example of the wireless communication device 102 described in connection with FIG. 1. The wireless communication device 1002 may include a thermal condition detection block/module 1004, a battery level detection block/module 1014, a connection status detection block/module 1020 and/or a network search algorithm adaptation block/module 1008 that may be examples of corresponding elements described in connection with at least one of FIGS. 1, 5 and 8.

In some configurations, the network search algorithm adaptation block/module 1008 may adapt one or more network search algorithms 1010. For example, the network search algorithm 1010 may be an out of service (OOS) network search algorithm 1010. For instance, the wireless communication device 1002 may adapt one or more elements (e.g., out of service sleep cycle and out of service search duration) of the out of service network search algorithm 1010. Additionally or alternatively, the network search algorithm 1010 may be a better system (re)selection (BSR) network search algorithm 1010. In this example, the wireless communication 1002 may adapt one or more elements (e.g., better system selection timeline and better system selection search duration) of the better system (re)selection network search algorithm 1010. Accordingly, the network search algorithm adaptation block/module 1008 may adapt one or more network search algorithms 1010 in some configurations. For example, the network search algorithm adaptation block/module 1008 may adapt multiple separate network search algorithms 1010. Furthermore, each network search algorithm 1010 may be adapted separately and/or may be adapted based on separate criteria. For instance, the first threshold, second threshold, battery level threshold and/or connection status criteria may be the same or different for each network search algorithm 1010.

The thermal condition detection block/module 1004 may provide a thermal condition input 1006, that may be an example of the thermal condition input 106 described in connection with FIG. 1, to the network search algorithm adaptation block/module 1008. The battery level detection block/module 1014 may provide a battery level input 1016, that may be an example of the battery level input 516 described in connection with FIG. 5, to the network search algorithm adaptation block/module 1008. The connection status detection block/module 1020 may provide a connection status input 1022, that may be an example of the connection status input 822 described in connection with FIG. 8, to the network search algorithm adaptation block/module 1008.

The network search algorithm adaptation block/module 1008 may include a network search algorithm 1010 that may be an example of the network search algorithm 110 described in connection with FIG. 1. Optionally, the network search algorithm adaptation block/module 1008 may include a thermal condition threshold determination block/module 1012 and/or a battery level threshold determination block/module 1018 that may be examples of corresponding elements described in connection with at least one of FIGS. 3 and 5.

As described above, the network search algorithm adaptation block/module 1008 may adapt a network search algorithm 1010 based on at least one of the inputs (e.g., the wireless communication device 1002 thermal condition input 1006, the wireless communication device 1002 battery level input 1016 and/or the wireless communication device 1002 connection status input 1022). For example, the wireless communication device 100 may determine that the wireless communication device 1002 thermal condition input 1006 is at least equal to a first thermal condition threshold, that the wireless communication device 1002 battery level input 1016 is less than a battery level threshold and that the wireless communication device 1002 connection status input 1022 indicates that the wireless communication device 1002 is connected to a network. In this example, the network search algorithm adaptation block/module 1008 may adapt the network search algorithm 1010 according to a first configuration, for example by reducing the network search duration by a first amount (e.g., ten seconds) and/or increasing the network search sleep cycle by a first amount (e.g., ten seconds).

In another example, the wireless communication device 1002 may determine that the wireless communication device 1002 thermal condition input 1006 is at least equal to a first thermal condition threshold, that the wireless communication device 1002 battery level input 1016 is not less than a battery level threshold and that the wireless communication device 1002 connection status input 1022 indicates that the wireless communication device 1002 is not connected to a network. In this example, the network search algorithm adaptation block/module 1008 may adapt the network search algorithm 1010 according to a second configuration. In some implementations, the second configuration may differ from the first configuration. For example, according to the second configuration, the network search algorithm adaptation block/module 1008 may reduce the network search duration by a second amount (e.g., five seconds) and/or increasing the network search sleep cycle by a second amount (e.g., five seconds). While two examples have been given, the network search algorithm adaptation block/module 1008 may adapt the network search algorithm 1010 according to any number of configurations that may be based on any combination of input values. In some configurations, if the battery level is low, then searching time can be recomputed (e.g., reduced). Additionally or alternatively, if the device temperature is above a certain level, searching time can be reduced. If the wireless communication device 1002 has searched for the same system in a previous cycle, then the wireless communication device 1002 may avoid searching for that system in the next cycle in some configurations.

In some implementations, the wireless communication device 1002 may also include a receiver 1024 to allow reception of signals to the wireless communication device 1002. The receiver 1024 may be connected to an antenna 1026. The wireless communication device 1002 may also include (not shown) multiple transmitters, multiple receivers, multiple transceivers and/or additional antennas. In some implementations, the receiver 1024 may be coupled to the network search algorithm adaptation block/module 1008. In these implementations, the network search algorithm 1010 may direct the receiver 1024 when to search for network signals. For example, the network search algorithm 1010 may direct the receiver 1024 to search for network signals based on the adaptation from the network search algorithm adaptation block/module 1008.

Figure 11:
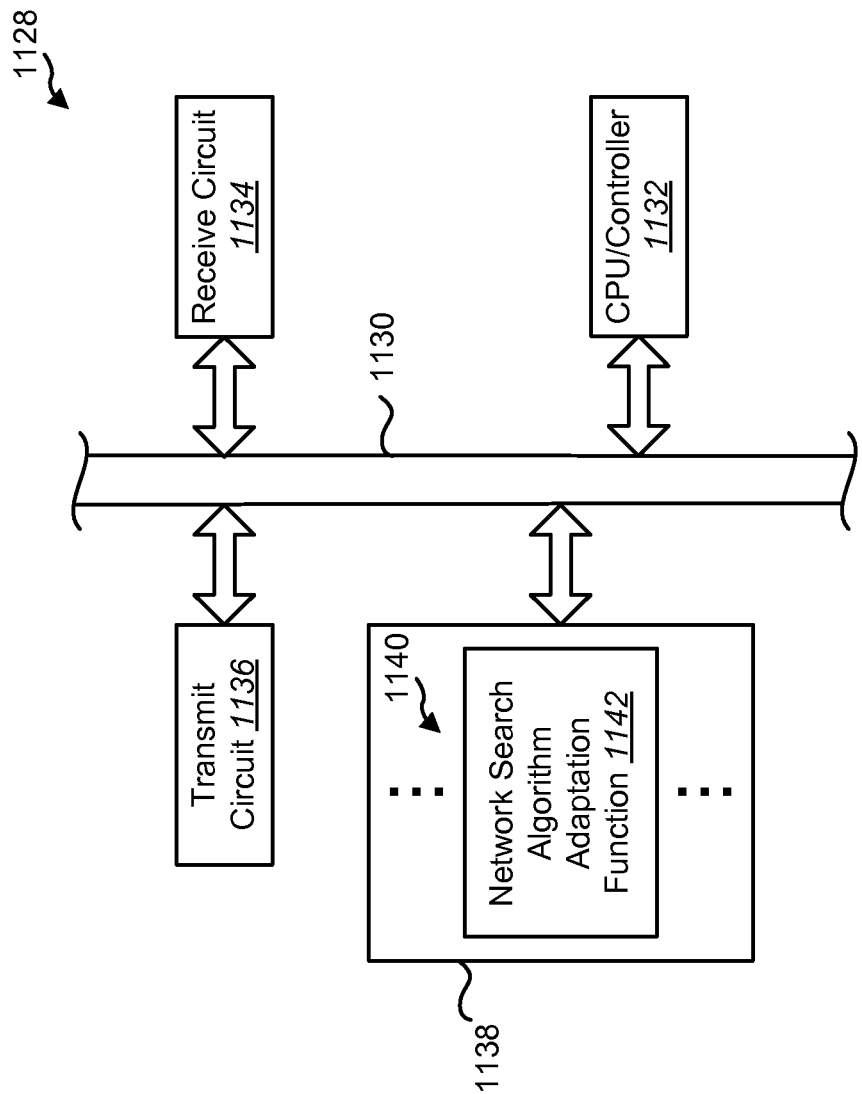
FIG. 11 shows part of a hardware implementation of an apparatus for executing the network search algorithm implementation methods described herein.

FIG. 11 shows part of a hardware implementation of an apparatus 1128 for executing the schemes or processes as described above. The apparatus 1128 comprises circuitry as described below. In this specification and the appended claims, it should be clear that the term "circuitry" is construed as a structural term and not as a functional term. For example, circuitry can be an aggregate of circuit components, such as a multiplicity of integrated circuit components, in the form of processing and/or memory cells, units, blocks and the like, such as shown and described in FIG. 11.

It should be noted that the term "apparatus" may be used herein to refer to a base station, an electronic device, a wireless communication device and/or other device. It should also be noted that a "communication system" may include one or more of a base station, an electronic device, a wireless communication device and other device(s).

In this example, the circuit apparatus is signified by the reference numeral 1128 and can be implemented in any of the communication entities described herein, such as the wireless communication device 102, 302, 502, 802 and 1002.

The apparatus 1128 comprises a central data bus 1130 linking several circuits together. The circuits include a CPU (central processing unit) or a controller 1132, a receive circuit 1134, a transmit circuit 1136, and a memory unit 1138.

If the apparatus 1128 is part of a wireless device, the receive circuit 1134 and the transmit circuit 1136 can be connected to an RF (radio frequency) circuit (which is not shown in the drawing). The receive circuit 1134 processes and buffers received signals before sending the signals out to the data bus 1130. On the other hand, the transmit circuit 1136 processes and buffers the data from the data bus 1130 before sending the data out of the apparatus 1128. The CPU/controller 1132 performs the function of data management of the data bus 1130 and furthers the function of general data processing, including executing the instructional contents of the memory unit 1138.

The memory unit 1138 includes a set of modules and/or instructions generally signified by the reference numeral 1140. In this example, the modules/instructions include, among other things, a network search algorithm adaptation function 1142 which carries out the schemes and processes as described above. The function 1142 includes computer instructions or code for executing the process steps as shown and described in FIGS. 1-10. Specific instructions particular to an entity can be selectively implemented in the function 1142. For instance, if the apparatus 1128 is part of a wireless communication device 102, 302, 502, 802 or 1002, among other things, instructions particular to the wireless communication device 102, 302, 502, 802 or 1002, as shown and described in FIGS. 1-10 can be coded in the function 1142.

In this example, the memory unit 1138 is a RAM (random access memory) circuit. The example functions, such as the function 1142, include one or more software routines, modules and/or data sets. The memory unit 1138 can be tied to another memory circuit (not shown) which either can be of the volatile or nonvolatile type. As an alternative, the memory unit 1138 can be made of other circuit types, such as an EEPROM (electrically erasable programmable read only memory), an EPROM (electrical programmable read only memory), a ROM (read only memory), an ASIC (application specific integrated circuit), a magnetic disk, an optical disk and others well known in the art.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The techniques described herein may be used for various communication systems, including communication systems that are based on an orthogonal multiplexing scheme. Examples of such communication systems include orthogonal frequency division multiple access (OFDMA) systems, single-carrier frequency division multiple access (SC-FDMA) systems and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The foregoing presentation of the described configurations is provided to enable any person skilled in the art to make or use the methods and other structures disclosed herein. The flowcharts, flow diagrams, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that may carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is noted that the various methods disclosed herein (e.g., methods and other methods disclosed by way of description of the operation of the various apparatus described herein) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

In one or more examples, the operations described herein may be implemented in hardware, software, firmware or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer.

Further, it should be appreciated that modules and/or other appropriate means for performing the methods and techniques described herein, such as those illustrated by FIGS. 2, 4, 6, 7 and 9, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

No claim element is to be construed under the provisions of 35 U.S.C. §112, sixth paragraph, unless the element is expressly recited using the phrase "means for" or, in the case of a method claim, the element is recited using the phrase "step for."

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An apparatus operable in a communication system, comprising:
   means for obtaining a wireless communication device thermal condition input, wherein the wireless communication device thermal condition input includes a value indicating a temperature of at least one wireless communication device component;
   means for obtaining a wireless communication device battery level input;
   means for adapting a network search algorithm based on the wireless communication device thermal condition input and the wireless communication device battery level input, wherein the means for adapting the network search algorithm comprises means for disregarding the wireless communication device battery level input when the wireless communication device thermal condition input is at least equal to a second thermal condition threshold; and
   means for performing the adapted network search algorithm.

2. The apparatus of claim 1, further comprising means for determining whether the wireless communication device thermal condition input is at least equal to a first thermal condition threshold.

3. The apparatus of claim 2, wherein adapting a network search algorithm comprises adapting the network search algorithm when the wireless communication device thermal condition input is at least equal to the first thermal condition threshold.

4. The apparatus of claim 3, wherein the second thermal condition threshold is greater than the first thermal condition threshold.

5. The apparatus of claim 1, wherein adapting a network search algorithm comprises adapting a network search timeline.

6. The apparatus of claim 5, wherein adapting a network search timeline comprises increasing a network search sleep cycle.

7. The apparatus of claim 5, wherein adapting a network search timeline comprises reducing a network search duration.

8. The apparatus of claim 1, wherein the network search algorithm is an out of service network search algorithm.

9. The apparatus of claim 1, wherein the network search algorithm is a better system selection network search algorithm.

10. The apparatus of claim 1, further comprising means for determining whether the wireless communication device battery level input is less than a battery level threshold.

11. The apparatus of claim 10, wherein adapting a network search algorithm comprises adapting the network search algorithm when the wireless communication device battery level input is less than the battery level threshold.

12. The apparatus of claim 1, further comprising means for determining whether the wireless communication device thermal condition input is at least equal to the second thermal condition threshold.

13. The apparatus of claim 12, wherein adapting a network search algorithm comprises adapting a network search algorithm when the wireless communication device thermal condition input is at least equal to the second thermal condition threshold.

14. The apparatus of claim 1, further comprising means for obtaining a wireless communication device connection status input, and wherein adapting a network search algorithm is further based on the wireless communication device connection status input.

15. The apparatus of claim 14, wherein adapting a network search algorithm comprises adapting the network search algorithm when the wireless communication device is connected.

16. The apparatus of claim 15, wherein adapting the network search algorithm further comprises avoiding searching for a network in a subsequent cycle when the wireless communication device has searched for the network in a previous cycle.

17. The apparatus of claim 14, wherein obtaining a wireless communication device connection status input comprises determining whether a wireless communication device is connected to a wireless local area network.

18. The apparatus of claim 14, wherein adapting the network search algorithm comprises increasing a network search sleep cycle and/or reducing the network search duration when the wireless communication device thermal condition input is at least equal to a first thermal condition and when the wireless communication device connection status input indicates a wireless communication device is connected.

19. An apparatus, comprising:
  circuitry configured to obtain a wireless communication device thermal condition input, wherein the wireless communication device thermal condition input includes a value indicating a temperature of at least one wireless communication device component;
  circuitry configured to obtain a wireless communication device battery level input;
  circuitry configured to adapt a network search algorithm based on the wireless communication device thermal condition input and the wireless communication device battery level input, wherein the circuitry configured to adapt the network search algorithm disregards the wireless communication device battery level input when the wireless communication device thermal condition input is at least equal to a second thermal condition threshold; and
  circuitry configured to perform the adapted network search algorithm.

20. The apparatus of claim 19, further comprising circuitry configured to determine whether the wireless communication device thermal condition input is at least equal to a first thermal condition threshold.

21. The apparatus of claim 20, wherein adapting a network search algorithm comprises adapting the network search algorithm when the wireless communication device thermal condition input is at least equal to the first thermal condition threshold.

22. The apparatus of claim 19, wherein adapting a network search algorithm comprises adapting a network search timeline.

23. The apparatus of claim 22, wherein adapting a network search timeline comprises increasing a network search sleep cycle.

24. The apparatus of claim 22, wherein adapting a network search timeline comprises reducing a network search duration.

25. The apparatus of claim 19, wherein the network search algorithm is an out of service network search algorithm.

26. The apparatus of claim 19, wherein the network search algorithm is a better system selection network search algorithm.

27. The apparatus of claim 19, further comprising circuitry configured to determine whether the wireless communication device battery level input is less than a battery level threshold.

28. The apparatus of claim 27, wherein adapting a network search algorithm comprises adapting the network search algorithm when the wireless communication device battery level input is less than the battery level threshold.

29. The apparatus of claim 19, further comprising circuitry configured to determine whether the wireless communication device thermal condition input is at least equal to the second thermal condition threshold.

30. The apparatus of claim 29, wherein adapting a network search algorithm comprises adapting the network search algorithm when the wireless communication device thermal condition input is at least equal to the second thermal condition threshold.

31. The apparatus of claim 19, further comprising circuitry configured to obtain a wireless communication device connection status input, and wherein adapting a network search algorithm is further based on the wireless communication device connection status input.

32. The apparatus of claim 31, wherein adapting a network search algorithm comprises adapting the network search algorithm when the wireless communication device is connected.

33. The apparatus of claim 31, wherein obtaining a wireless communication device connection status input comprises determining whether a wireless communication device is connected to a wireless local area network.

34. A method operable by an apparatus, comprising:
  obtaining a wireless communication device thermal condition input, wherein the wireless communication device thermal condition input includes a value indicating a temperature of at least one wireless communication device component;
  obtaining a wireless communication device battery level input;
  adapting a network search algorithm based on the wireless communication device thermal condition input and the wireless communication device battery level input, wherein adapting the network search algorithm comprises disregarding the wireless communication device battery level input when the wireless communication device thermal condition input is at least equal to a second thermal condition threshold; and
  performing the adapted network search algorithm.

35. The method of claim 34, further comprising determining whether the wireless communication device thermal condition input is at least equal to a first thermal condition threshold.

36. The method of claim 35, wherein adapting a network search algorithm comprises adapting the network search algorithm when the wireless communication device thermal condition input is at least equal to the first thermal condition threshold.

37. The method of claim 34, wherein adapting a network search algorithm comprises adapting a network search timeline.

38. The method of claim 34, wherein the network search algorithm is an out of service network search algorithm.

39. The method of claim 34, wherein the network search algorithm is a better system selection network search algorithm.

40. The method of claim 34, further comprising determining whether the wireless communication device battery level input is less than a battery level threshold.

41. The method of claim 40, wherein adapting a network search algorithm comprises adapting the network search algorithm when the wireless communication device battery level input is less than the battery level threshold.

42. The method of claim 34, further comprising determining whether the wireless communication device thermal condition input is at least equal to the second thermal condition threshold.

43. The method of claim 42, wherein adapting a network search algorithm comprises adapting the network search algorithm when the wireless communication device thermal condition input is at least equal to the second thermal condition threshold.

44. The method of claim 34, further comprising obtaining a wireless communication device connection status input, and wherein adapting a network search algorithm is further based on the wireless communication device connection status input.

45. The method of claim 44, wherein adapting a network search algorithm comprises adapting the network search algorithm when the wireless communication device is connected.

46. The method of claim 44, wherein obtaining a wireless communication device connection status input comprises determining whether a wireless communication device is connected to a wireless local area network.

47. A non-transitory tangible computer-readable medium having instructions thereon, the instructions comprising:
- code for causing an apparatus to obtain a wireless communication device thermal condition input, wherein the wireless communication device thermal condition input includes a value indicating a temperature of at least one wireless communication device component;
- code for causing the apparatus to obtain a wireless communication device battery level input;
- code for causing the apparatus to adapt a network search algorithm based on the wireless communication device thermal condition input and the wireless communication device battery level input, wherein the code for causing the apparatus to adapt the network search algorithm comprises code for causing the apparatus to disregard the wireless communication device battery level input when the wireless communication device thermal condition input is at least equal to a second thermal condition threshold; and
- code for causing the apparatus to perform the adapted network search algorithm.

48. The non-transitory tangible computer-readable medium of claim 47, the instructions further comprising code for causing the apparatus to determine whether the wireless communication device thermal condition input is at least equal to a first thermal condition threshold.

49. The non-transitory tangible computer-readable medium of claim 47, the instructions further comprising code for causing the apparatus to obtain a wireless communication device connection status input, and wherein adapting a network search algorithm is further based on the wireless communication device connection status input.

* * * * *